United States Patent [19]
Knipe et al.

[11] Patent Number: 5,912,758
[45] Date of Patent: Jun. 15, 1999

[54] BIPOLAR RESET FOR SPATIAL LIGHT MODULATORS

[75] Inventors: Richard L. Knipe, McKinney; Peter F. Vankessel, Allen, both of Tex.

[73] Assignee: Texas Instruments Incorporated, Dallas, Tex.

[21] Appl. No.: 09/059,192

[22] Filed: Apr. 13, 1998

Related U.S. Application Data

[63] Continuation-in-part of application No. 08/712,042, Sep. 11, 1996, Pat. No. 5,768,007.
[51] Int. Cl.$^6$ .................................................. G02B 26/00
[52] U.S. Cl. ........................ 359/290; 359/291; 359/296; 359/224; 359/230
[58] Field of Search .................................... 359/290, 291, 359/296, 214, 224, 230, 301, 314, 315, 316, 317, 304, 846

[56] References Cited

U.S. PATENT DOCUMENTS

| | | |
|---|---|---|
| 5,061,049 | 10/1991 | Hoenbeck .............................. 359/224 |
| 5,096,279 | 3/1992 | Hornbeck et al. ..................... 359/230 |
| 5,202,785 | 4/1993 | Nelson .................................... 359/224 |
| 5,583,688 | 12/1996 | Hornbeck ............................... 359/291 |
| 5,706,123 | 1/1998 | Miller et al. ........................... 359/291 |
| 5,771,116 | 6/1998 | Miller et al. ........................... 359/291 |

*Primary Examiner*—Loha Ben
*Attorney, Agent, or Firm*—Charles A. Brill; Frederick J. Telecky, Jr.; Richard L. Donaldson

[57] ABSTRACT

A method of resetting the cells of a spatial light modulator (FIG. 11). A saturation voltage pulse is applied, causing the cells to achieve a fully saturated state in a given amount of time. A reset pulse of opposite polarization than the saturation voltage pulse is then applied, driving the cells toward the opposite fully saturated state. The reset pulse is removed after the same amount of time, causing the cells to assume their relaxed state in the same amount of time it took them to achieve their fully saturated state.

1 Claim, 5 Drawing Sheets

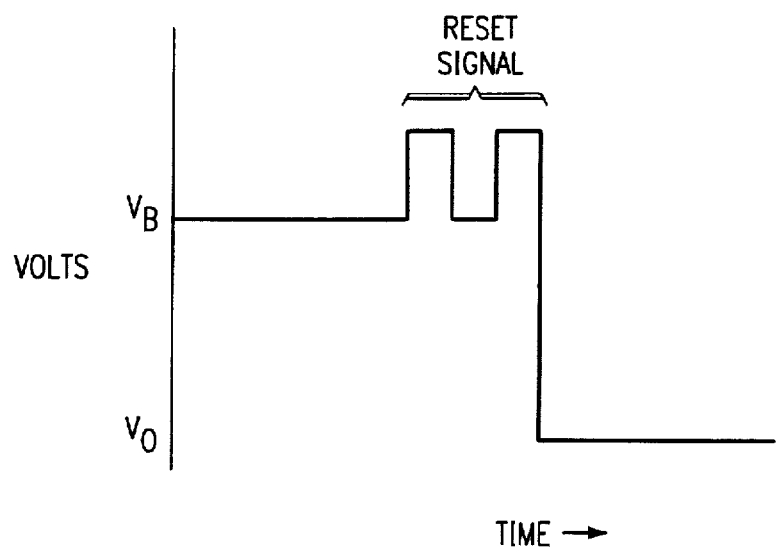
FIG. 6
FIG. 7
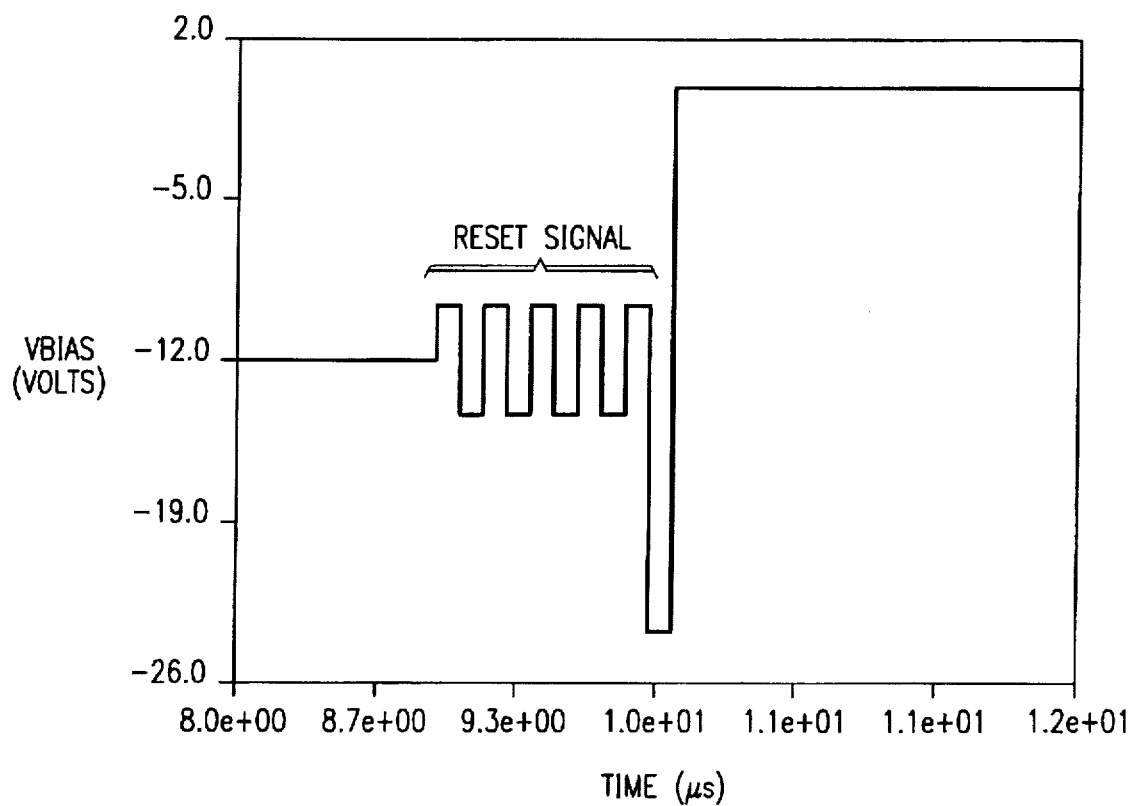

5,912,758

BIPOLAR RESET FOR SPATIAL LIGHT MODULATORS

This application is a continuation-in-part of Ser. No. 08/712,042, filed Sep. 11, 1996, now U.S. Pat. No. 5,768,007.

TECHNICAL FIELD OF THE INVENTION

This invention relates to digital micro-mirror devices, and more particularly, to a method for resetting the mirror elements of such devices.

BACKGROUND OF THE INVENTION

Spatial light modulators can form images by individually controlling light received by each picture element (pixel) of the final image. Typically these modulators comprise arrays of individual elements, each element on the modulator corresponding to an image pixel. The control of the light is achieved by allowing or blocking light from a source to reach the image surface. The amount of time the light is allowed on the surface determines the brightness and color of that pixel. Controlling the switching of the elements of the modulator controls that amount of light.

Spatial light modulators can be reflective or transmissive, micromechanical or crystalline. One type of micro-mechanical device is a digital micro-mirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each mirror is attached to one or more torsion hinges. The mirrors are spaced by means of air gaps, over underlying control circuitry. The control circuitry provides electrostatic forces, via address electrodes, which cause each mirror to selectively tilt.

For optimal operation of a DMD, each mirror should promptly return to its untilted, or equilibrium, position when desired. For a given sticking force at the landing surface, it is possible to define a hinge restoration force that will free the mirrors from a landed state. However, due to other system considerations, such as the desire to operate the DMD at relatively low voltages, it may not be practical to increase the hinge stiffness to a point where all mirrors will reset automatically upon removal of the address signal.

Crystalline modulators rely upon the birefringent nature of liquid crystal material when a field is applied to that material. In a typical liquid crystal light modulator such as twisted nematic (TN), the liquid crystal molecules stack up in a helix fashion through the depth of the cell. With no electric field applied, the polarization vector of the incoming light is rotated as the light passes through the cell. When an electric field is applied, the molecules change their orientation, reducing the amount of polarization vector rotation by an amount proportional to the field strength. By analyzing the output light from the modulator with a polarizer, the polarization vector rotation is translated into an intensity level which is proportional to the angle between the polarizer axis and the light polarization vector.

These types of modulators turn on rather quickly, but rely upon mechanical restorative forces to return the molecules to their twisted orientation when the electric field is removed. This relaxation process is relatively slow and causes degraded image quality when displaying moving imagery at video rates.

A method of resetting the elements of these modulators quickly is needed that does not further complicate the manufacture or increase the cost.

SUMMARY OF THE INVENTION

One aspect of the invention is using a bipolar reset technique on spatial light modulators. A first saturation pulse is applied to all of the cells of the modulator, regardless of their state. The duration of this pulse is sufficient to ensure that all of the cells reach the saturated state. At that time, an oppositely polarized reset signal is applied, actively driving the modulator elements toward the equilibrium position. The reset signal duration is determined such that molecules of LC modulators are at their equilibrium position at the end of the reset pulse.

It is an advantage of the invention in that it allows liquid crystals to be actively driven to every state, resulting in a substantial reduction in overall switch time. Such a reduction would result in improved image quality for motion video, and could potentially enable color sequential operation for single modulator transmissive or reflective LC color display systems.

BRIEF DESCRIPTION OF THE DRAWINGS

FIG. 6 illustrates a reset signal in accordance with the invention, used with a positive bias.

FIG. 7 illustrates an alternative reset signal in accordance with the invention, used with a negative bias and having an impulse.

DETAILED DESCRIPTION OF THE INVENTION

For purpose of example, the following description is in terms of a particular type of micro-mechanical device, a "digital micro-mirror device" (DMD), sometimes also referred to as a "deformable mirror device." As described in the Background, a DMD is comprised of tiny hinged mirrors, each supported over a substrate of control circuitry. The invention is directed to an improved method of providing a reset pulse for restoring the mirrors to their equilibrium position after they have been tilted. However, the same concepts could apply to any micro-mechanical device having a movable element that moves in response to electrostatic attraction, or even to other types of spatial light modulators.

One application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the "mirror" need not be reflective. Also, in some applications, the DMD is operated in an analog rather than a digital mode. In general, the term "DMD" is used herein to include any type of micro-mechanical device having at least one hinge-mounted deflectable element that is spaced by an air gap from a substrate, relative to which it moves.

Figure 1:
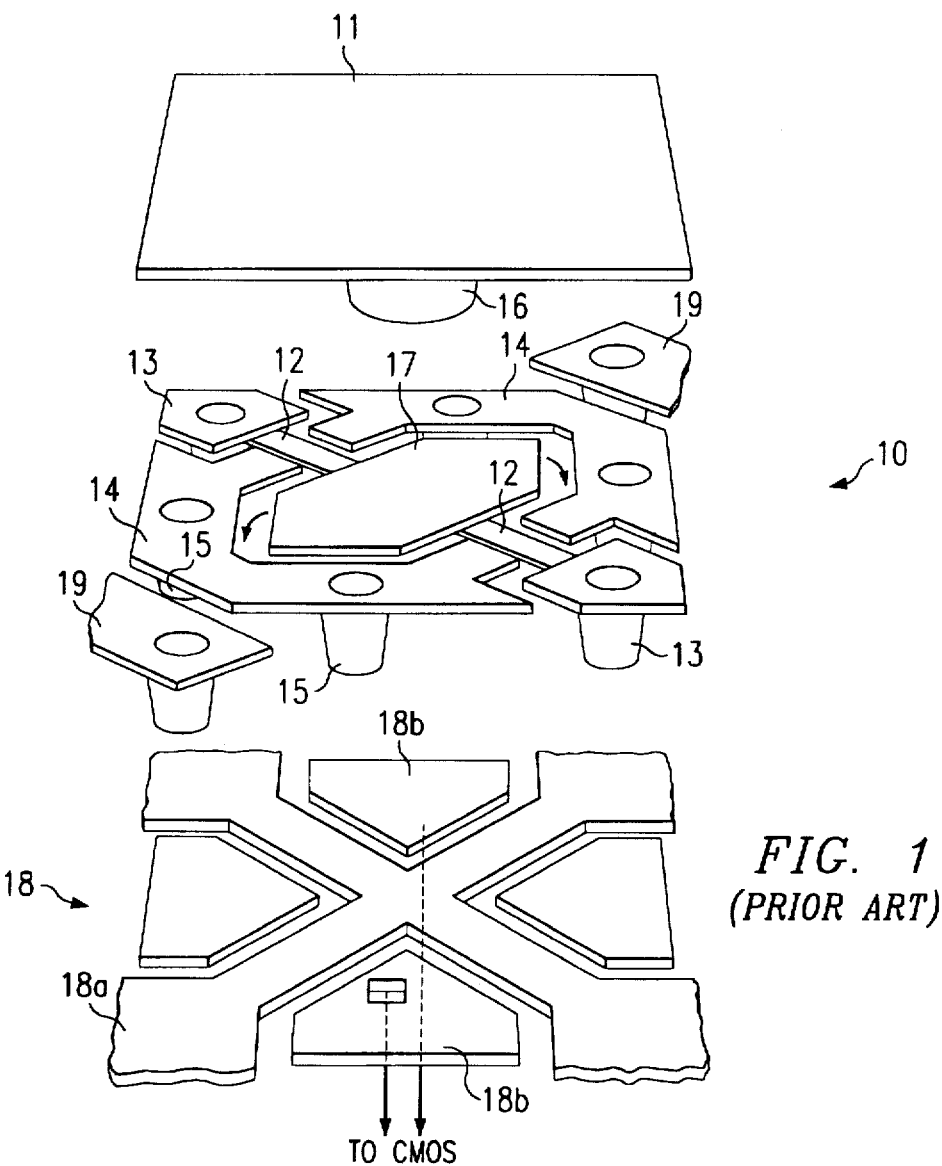
FIG. 1 is an exploded perspective view of a hidden hinge type mirror element of a digital micro-mirror device (DMD).

FIG. 1 is an exploded perspective view of a single mirror element 10 of a DMD. In FIG. 1, the mirror 11 is undeflected, but as indicated by the arrows, its torsion hinges 12 permit it to be deflected in either of two directions. As indicated above, various DMD applications may use such mirror elements 10 singly or in arrays.

The mirror element 10 of FIG. 1 is known as a "hidden hinge" mirror element. Other types of mirror elements 10 can be fabricated, including a "torsion beam" type, described below in connection with FIG. 2, where the mirror is mounted directly to the hinges instead of over a yoke to which the hinges are attached. Various DMD types are described in U.S. Pat. No. 4,662,746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-Level Deformable Mirror Device"; and U.S. patent Ser. No. 08/171,303, now U.S. Pat. No. 5,583,688, entitled "Improved Multi-Level Micro-Mirror Device." Each of these patents is assigned to Texas Instruments Incorporated and each is incorporated herein by reference.

As with other hidden hinge DMD designs, the hinges 12 of mirror element 10 are supported by hinge support posts 13, which are formed on a substrate. Address electrodes 14 are supported by address electrode support posts 15, which are on the same level as hinges 12 and hinge support posts 13.

Mirror support post 16 is fabricated on a yoke 17. Yoke 17 is attached to one end of each of the two hinges 12. The other end of each hinge 12 is attached to a hinge support post 13. The hinge support posts 13 and the electrode support posts 15 support the hinges 12, address electrodes 14, and yoke 17 over a substrate having a control bus 18a. When mirror 11 is tilted, the tip of mirror 11 contacts a landing site 19. The address electrodes 14 have appropriate electrical connections to memory cells (not shown), which are typically fabricated within substrate 18 using CMOS fabrication techniques.

Figure 2:
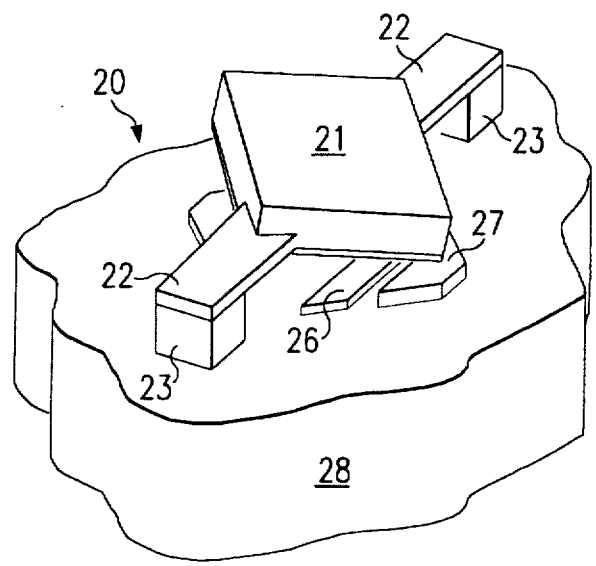
FIG. 2 is a perspective view of a torsion beam type mirror element of a DMD.

FIG. 2 illustrates a mirror element 20 of a "torsion beam" type DMD. The hinges 22 are not hidden, but rather extend from opposing sides of mirror 21. Hinges 22 are attached to hinge support posts 23. Address electrodes 26 provide attractive forces for tilting the mirror 21, which touches a landing pad 27. The mirror element 20 is fabricated over a substrate 28 of memory cells and control circuitry.

Many variations of the designs of FIGS. 1 and 2 are possible. For example, the yoke 17 (or mirror 21) could be notched so that the hinges 12 (or 22) are set in. The hinges 12 (or 22) could be attached at a side of yoke 17 (or mirror 21) as in FIG. 1 or at a corner as in FIG. 2. Furthermore, the hinge attachment need not be at opposing corners or sides. The hinges could be attached so as to permit asymmetric tilting.

In operation for image display applications, and using an array of mirror elements 20 for example, a light source illuminates the surface of the DMD. A lens system may be used to shape the light to approximately the size of the array of mirror elements 20 and to direct this light toward them. Voltages based on data in the memory cells of substrate 28 are applied to the address electrodes 26. Electrostatic forces between the mirrors 21 and their address electrodes 26 are produced by selective application of voltages to the address electrodes 26. The electrostatic force causes each mirror 21 to tilt either about +10 degrees (on) or about −10 degrees (off), thereby modulating the light incident on the surface of the DMD. Light reflected from the "on" mirrors 21 is directed to an image plane, via display optics. Light from the "off" mirrors 21 is reflected away from the image plane. The resulting pattern forms an image. The proportion of time during each image frame that a mirror 21 is "on" determines shades of gray. Color can be added by means of a color wheel or by a three-DMD setup.

In effect, the mirror 21 and its address electrodes 26 form capacitors. When appropriate voltages are applied to mirror 21 and its address electrodes 26, a resulting electrostatic force (attracting or repelling) causes the mirror 21 to tilt toward the attracting address electrode 26 or away from the repelling address electrode 26. The mirror 21 tilts until its edge contacts landing pad 27. Once the electrostatic force between the address electrodes 26 and the mirror 21 is removed, the energy stored in the hinges 22 provides a restoring force to return the mirror 21 to an undeflected position, or equilibrium position. Appropriate voltages may be applied to the mirror 21 or address electrodes 26 to aid in returning the mirror 21 to its equilibrium position.

Figure 3:
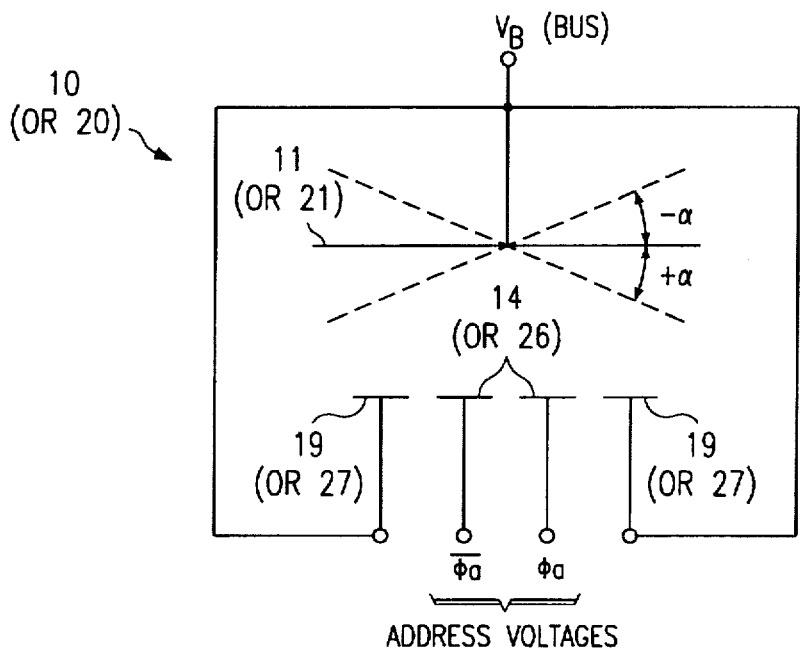
FIG. 3 is a schematic cross sectional view of portions of the mirror element of FIG. 1 or of FIG. 2.

FIG. 3 is a schematic cross sectional view of a portion of mirror element 10 (or 20) and its operating voltages. Depending on the state of its underlying memory cell, each mirror 11 (or 21) is attracted by a combination of bias and address voltages to one or the other of the address electrodes 14 (or 26). It rotates until its tip touches a landing site 19 (or 27), which is held at the same potential as the mirror by the bias voltage. The complementary address voltages, $V_a$ and $-V_a$, are switched back and forth and held while the data is being displayed (the bit period). A typical tilt angle, + or −, is 10 degrees. In other types of DMD's, the yoke 17 contacts a landing site on the substrate, rather than the mirror contacting a landing site. The invention described herein is applicable to these types of DMD's, with the yoke being equivalent to the mirror for purposes of applying the reset pulse in accordance with the invention.

Figure 4:
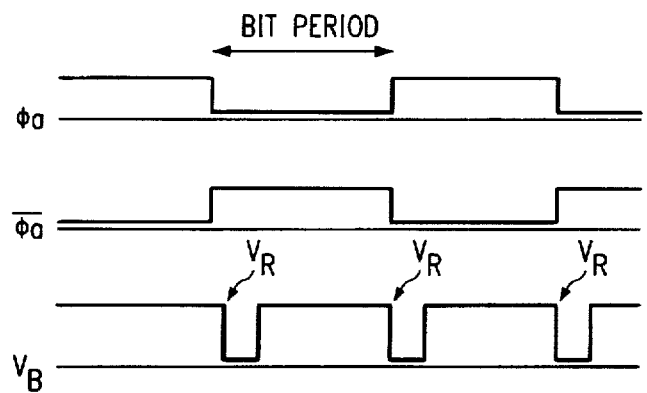
FIG. 4 illustrates the timing relationship of the address and bias voltages of FIG. 3, as well as of the reset signal.

FIG. 4 illustrates the relationship of the address and bias voltages. The address voltages, $V_a$ and $-V_a$, are complementary and remain on or off during the bit period. Typical address voltages are 0 and 5 volts. After every switch of the address voltages, the bias voltage, $V_b$, is turned off then on. This is designed to permit the mirror to return to its flat state (reset) and to then tilt to its new state. In FIG. 4, the bias voltage is positive. A typical bias voltage is 12 volts, and a typical bias off time is 3–5 microseconds. As stated in the Background, an extra amplitude of voltage is often added to the bias at points $V_r$ to encourage the mirrors to reset. This extra voltage, referred to herein as the "reset signal," is added just before the bias is turned off. The invention is directed to a method of providing an optimal reset signal. The "reset position" can be flat or could be deflected to the other address electrode, as long as the final position is one in which the element is at a stable equilibrium state, either latched into place on the opposite electrode or flat. The invention could be used to reset a mirror or other micromechanical element that tilts in only one direction.

One aspect of the invention is the recognition that with prior reset signals, in particular, those that use multiple pulses, a mirror (or yoke) that becomes free before the final pulse can reattach to the landing surface. This reattachment can be perceived as a "twinkling" effect. Although a single-pulse reset signal at a sufficiently high voltage could eliminate the twinkling, the use of a single pulse is inefficient and higher voltages are required than with resonant pulses.

Figure 5:
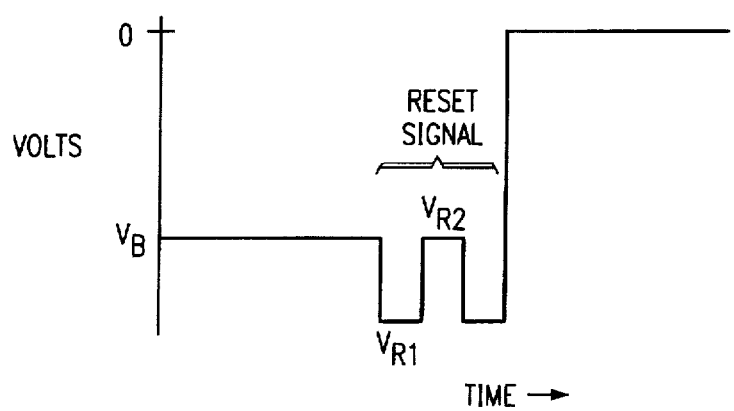
FIG. 5 illustrates a reset signal in accordance with the invention, used with a negative bias.

FIG. 5 illustrates a reset signal in accordance with the invention, as applied to a negative bias voltage. In this embodiment, the reset signal is comprised of two resonant pulses. The bias is maintained during the reset signal. The amplitude of the reset pulses is small relative to the bias voltage and is near the level of the bias. Their polarity is the same as the bias, such that the total amplitude of the voltage is increased. In FIG. 5, $V_{R1}$ is less than $V_B$, and $V_{R2}$ is the same as $V_B$. It is also possible that $V_{R2}$ could be less than $V_B$.

A typical duration of the pulses is about one-half microsecond. The resonant frequency is determined by the structure of the mirror element, and can be determined experimentally. Typical resonant frequencies for DMD devices such as those currently being manufactured by Texas Instruments Incorporated are in the order of 2–5 MHZ.

FIG. 6 illustrates another reset signal, which is like that of FIG. 5, except that the bias voltage is positive. The reset pulses have a polarity in the positive direction, which is the same as the bias. As in FIG. 5, the amplitude of the resulting total voltage is increased.

FIG. 7 illustrates another reset signal in accordance with the invention. In FIG. 7, the bias is negative, with an amplitude of -12 volts. The reset signal is comprised of resonant excitation pulses combined with a single impulse. The excitation pulses are at a voltage near the bias voltage, and the impulse has a larger magnitude than the preceding pulses. The impulse is applied in phase with the excitation pulses. The bias voltage is applied during the pulses and is released with the impulse. The polarity of the pulses is such that the average voltage is the same as the bias. The polarity of the impulse is the same as that of the bias and results in a voltage magnitude larger than that of the bias.

For purposes of example, FIG. 7 illustrates a reset signal having five pulses prior to the final impulse. For a bias difference of 12 volts, each pulse has a magnitude of about 2.5 volts more or less than the bias. The impulse has a magnitude of about -12 volts, resulting in a total voltage of about -24 volts.

Figure 8:
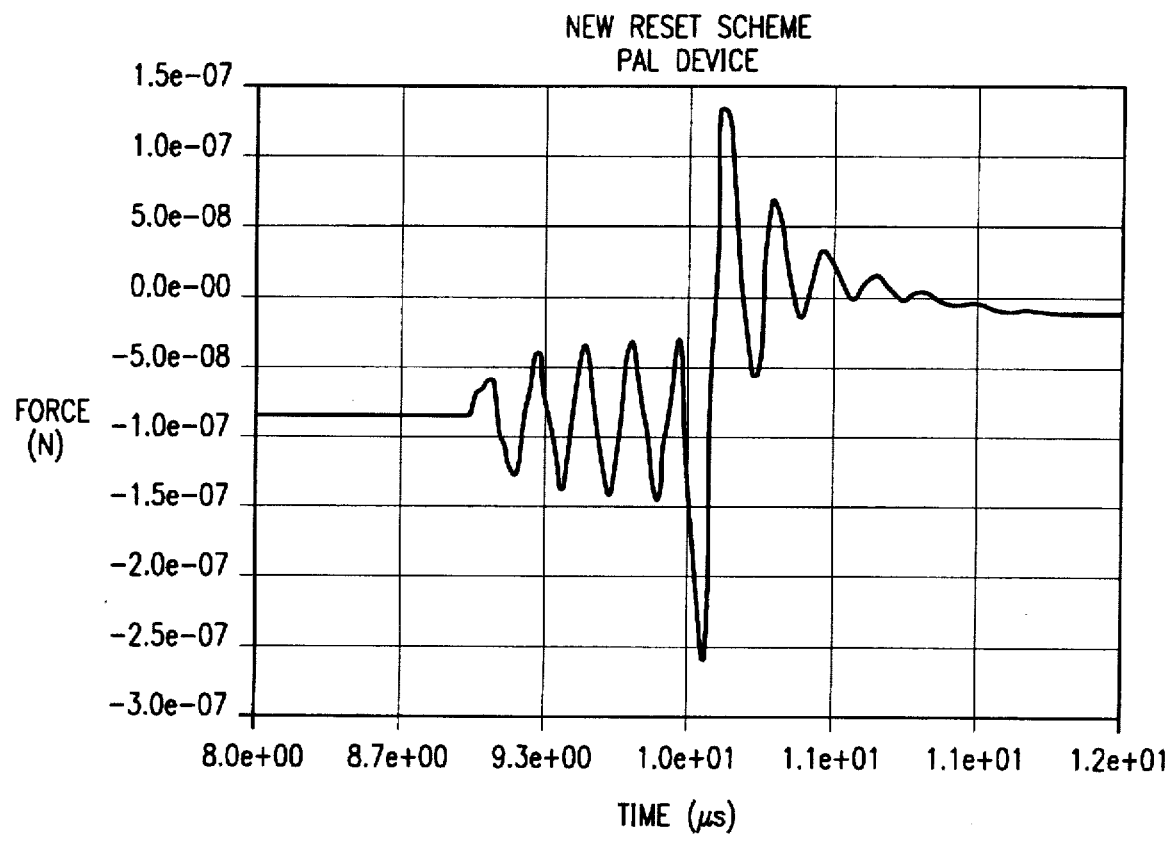
FIG. 8 illustrates the landing tip separation force during the reset signal of FIG. 7.

FIG. 8 illustrates the calculated landing tip separation force during the reset signal of FIG. 7. The calculation assumes that the landing tip of the mirror remains attached even after the final impulse, which facilitates the calculations. Under normal operation, the landing tip should break free at the impulse and the remainder of the calculation would be invalid. The amplitude of the pulses relative to the bias and the number of pulses are selected such that a net negative force is maintained on the mirror tip until the final impulse. The force from the pulses is insufficient to allow for release of the mirrors from the landing surface, and thus the mirrors remain tilted until the reset signal is complete. The resonant vibration resulting from the pulses allows the buildup of energy, which is released with the final impulse. This resonant energy enhances the ability of any stuck mirrors to break free of the landing surface. In general, as more pulses at a given amplitude are applied, the energy increases.

Figure 9:
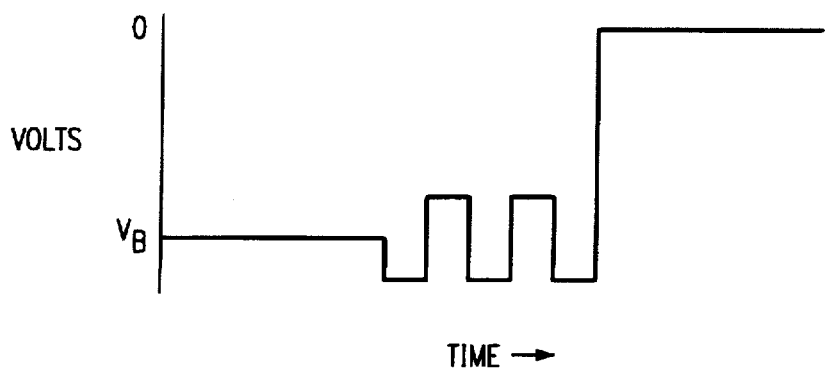
FIGS. 9 and 10 illustrate additional alternative reset signals in accordance with the invention.

FIG. 9 illustrates another reset signal, which is similar to that of FIG. 5 in that it does not have an impulse at the end of the reset signal. However, the pulses of the reset signal vary above and below the bias, so that the average voltage during the reset signal is maintained at the bias level.

Figure 10:
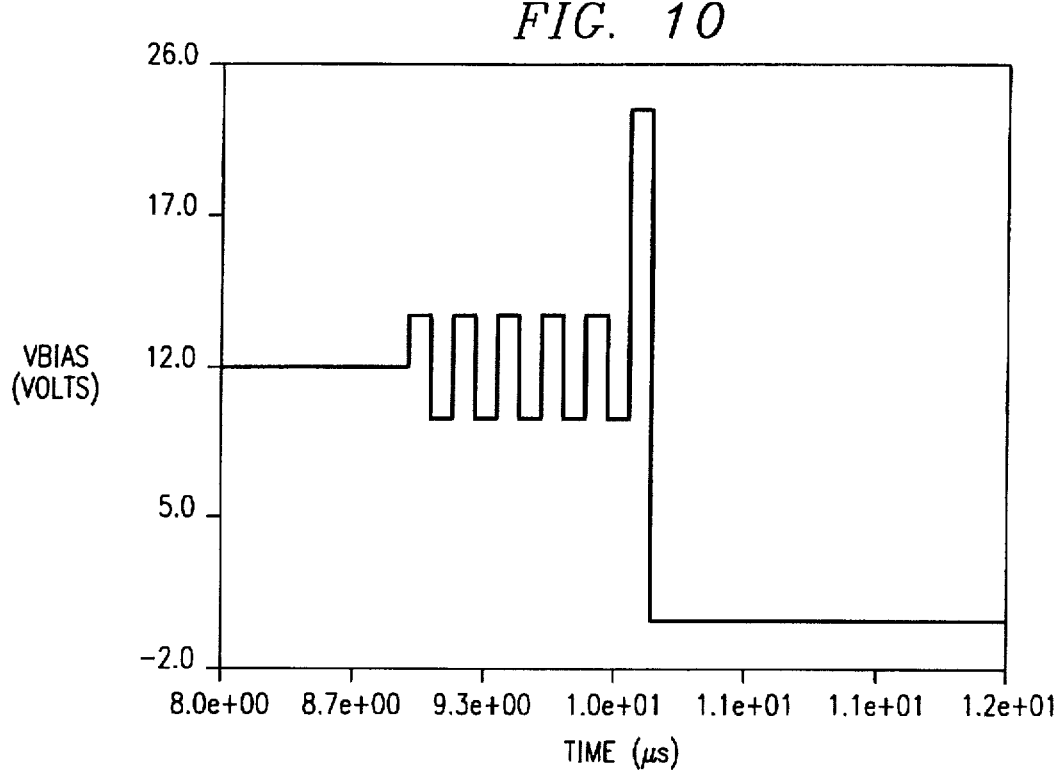

FIG. 10 illustrates a reset signal applied to a positive bias. Otherwise, the reset signal is analogous to that of FIG. 7.

In all of the above reset schemes, the reset signal is comprised of two or more resonant pulses, which are added to the bias voltage, with or without a final impulse. The amplitude of the pulses is near the bias level. The bias is applied until the final impulse, if any. The final impulse, if there is one, is in the direction of the bias. Thus, if the bias is positive, the impulse results in increased positive voltage; if the bias is negative, the impulse results in increased negative voltage. The pulses maintain the mirror in a vibrational mode while keeping the net force near that provided by the bias. As a result, any stuck mirrors do not become unstuck until the end of the reset signal, and therefore do not have an opportunity to become restuck.

As will be discussed below, the application of the final impulse can be used in other types of spatial light modulators, such as liquid crystal devices. Instead of it being used to unstick micromechanical devices, however, it is used in a similar fashion to ensure that all of the cells are in the same state prior to reset.

Experimentation has shown that a particular DMD device may perform optimally with a certain reset pattern. For example, for a "hidden hinge" device, such as that of FIG. 1, the 2-pulse pattern of FIG. 5 has good results. For a "torsion beam" device, such as that of FIG. 2, a 3-pulse pattern has good results. In both cases, the pattern was evaluated in terms of efficiency as well as reduction of twinkling.

In the case of liquid crystal devices, the last embodiment shown in FIG. 10 can be modified to speed up the switching speed of liquid crystal devices. Typically, liquid crystal devices comprises two glass plates, with electrode arrays or some other means for setting up an array of controllable fields on the glass. When each cell in the array is activated, the fields cause the liquid crystal molecules to line up parallel to the field direction. The amount of twist in the LC molecule orientation is directly related to the field strength, and the amount of twist determines the amount of light blocked. With no field applied, the molecules are lined up with the maximum amount of twist (a typical value for an active matrix TN LCD is 90 degrees through the depth of the cell). This typically corresponds to the on state discussed above with regard to micromechanical modulators.

Liquid crystal devices typically operate very slowly. When the fields are applied, the LC molecules reorient relatively quickly, losing their twisted orientation. However, when the field, or address bias, is removed, they rely upon mechanical relaxation forces to return to their twisted or equilibrium state. This takes a relatively long time, making the switching time very long.

Another problem lies in the intermediate states assumed by the liquid crystal molecules in cells that are neither at equilibrium or saturated, in their fully untwisted configuration. For discussion purposes, we will refer to the fully twisted, transmitting state as the horizontal state, and the fully untwisted, blocking state as vertical. After the image data is processed and the cell address voltages are applied, the cells could be in one of several different states. They could be horizontal, vertical, or any stage in between. Therefore, the system would have to assume the worst case, that there were cells in the fully vertical state, and would need to leave that much time for them to relax back to the horizontal state.

However, by applying the above phased matched reset, or bipolar reset, techniques to liquid crystal cells, it is possible to force the turn on time in which the molecules relax to fully twisted orientation to equal the turn off time. Looking now at FIG. 11, it is possible to see one embodiment of this application.

Up until the time, $t_{ADD}$, each cell is in whatever state that cell's address voltage placed it. At $t_{ADD}$, however, the system applies the necessary voltage, the saturation voltage $V_{SAT}$, to cause each cell to assume the fully vertical state. This takes the shorter time discussed above, $t_{ON}$, which is the amount of time to go from horizontal to vertical.

Figure 11:
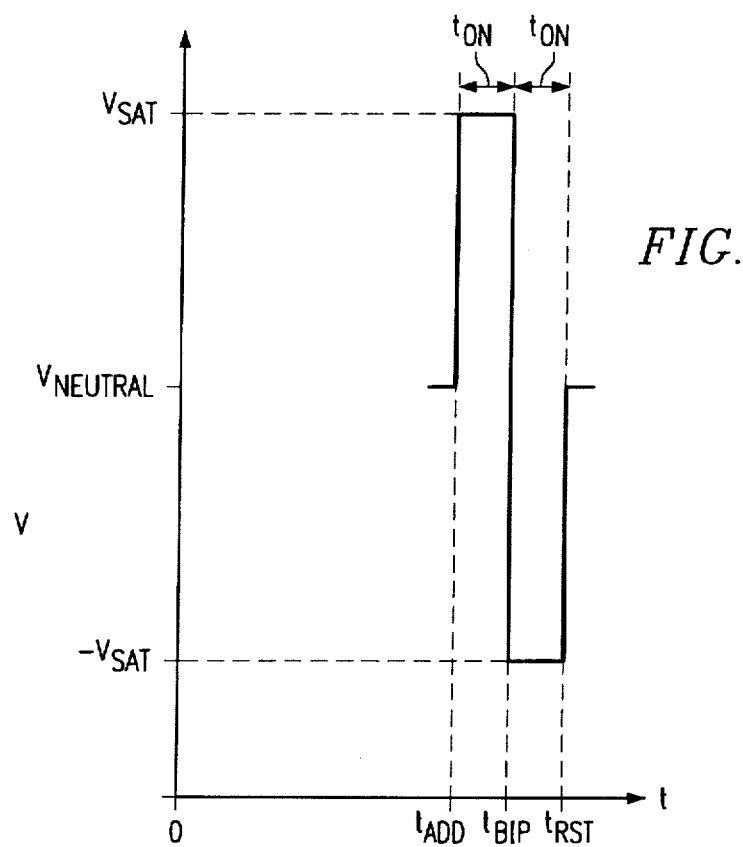
FIG. 11 shows a bipolar reset waveform applied to a liquid crystal spatial light modulator application.

Once that time has elapsed at $t_{BIP}$ the final bipolar reset impulse discussed with reference to FIGS. 1–10 is applied. This pulse drives the cells from fully vertical in one direction to fully vertical one hundred and eighty degrees to the other direction. To go from fully vertical to horizontal to fully vertical the opposite way would take $2t_{ON}$. However, the goal is to move the cells to the horizontal, or equilibrium state, so the opposite polarity pulse is only applied for $t_{on}$. This drives the cells to the equilibrium state. Note that FIG. 11 is the voltage diagram, not the state of the cells. The cells do not actually go to the opposite vertical state, they merely stop at the horizontal state.

The last embodiment of the invention allows the cells to switch from fully vertical to fully horizontal in the same amount of time that it takes for them to go from fully horizontal to fully vertical. This time is considerably shorter than that achieved relying upon mechanical relaxation in the crystal material. This allows the modulator to process data faster, making them more efficient and allowing creation of better images.

The waveform shown in FIG. 11 is simplified, and for illustrative purposes only. It does not comprehend DC restoration techniques. Also, the magnitude of the voltages depends upon the cell gap between the glass plates of the modulator as well as the nature of the liquid crystal material itself. The selection of those individual magnitudes as well as determination of the specific pulse durations are left to the system designers. However, it must be noted that FIG. 11 appears to assume the liquid crystal material is oriented fully vertical with a positive saturation voltage, or at least a voltage that is 'less negative' than the bipolar reset pulse. FIG. 11 is in no way intended to limit the invention in this manner. The pulse applied at $t_{ADD}$ could be oppositely polarized and the pulse applied at $t_{BIP}$ would merely be oppositely polarized to that pulse. Additionally, while we have described the embodiment associated with FIG. 11 in the context of a TN LC device, it is also applicable to other types of liquid crystal devices.

After achieving the fully horizontal state at $t_{RST}$, fields could then be applied to the cells to process the next part of the image. The state of the cells prior to $t_{ADD}$ and after $t_{RST}$ are of no interest to the use of the invention.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of resetting the cells of a spatial light modulator, said cells being in undetermined states, comprising the steps of:

applying a saturation voltage pulse of a first polarity to all of the cells of said spatial light modulator, operable to drive all cells to a known saturated state for a predetermined amount of time;

applying a reset voltage pulse of a second polarity opposite to said first polarity of said saturation pulse, operable to drive all cells towards an opposite saturated state for said predetermined amount of time; and removing said reset voltage pulse.

* * * * *